United States Patent [19]
Chen et al.

[11] Patent Number: 6,045,603
[45] Date of Patent: Apr. 4, 2000

[54] TWO PHASE PRESSURE SWING ADSORPTION PROCESS

[75] Inventors: Yudong Chen, Bridgewater; Akhilesh Kapoor, Basking Ridge; Narayanan Ramprasad, Bridgewater, all of N.J.

[73] Assignee: The BOC Group, Inc., Murray Hill, N.J.

[21] Appl. No.: 09/138,142

[22] Filed: Aug. 21, 1998

[51] Int. Cl.[7] .............................................. B01D 53/047
[52] U.S. Cl. ............................. 95/101; 95/100; 95/102; 95/103; 95/105; 95/140
[58] Field of Search .................... 95/96–98, 100–106, 95/140

[56] References Cited

U.S. PATENT DOCUMENTS

| Re. 32,590 | 2/1988 | Sakuraya et al. | 95/101 |
|---|---|---|---|
| 4,359,328 | 11/1982 | Wilson | 95/98 |
| 4,512,780 | 4/1985 | Fuderer | 95/100 |
| 4,539,020 | 9/1985 | Sakuraya et al. | 95/101 |
| 4,713,090 | 12/1987 | Yokoe et al. | 95/96 |
| 4,726,816 | 2/1988 | Fuderer | 95/98 |
| 5,032,150 | 7/1991 | Knaebel | 95/98 X |
| 5,096,470 | 3/1992 | Krishnamurthy | 95/102 |
| 5,126,310 | 6/1992 | Golden et al. | 95/140 X |
| 5,258,571 | 11/1993 | Golden et al. | 95/140 X |
| 5,370,728 | 12/1994 | LaSala et al. | 95/101 |
| 5,531,809 | 7/1996 | Golden et al. | 95/140 X |
| 5,536,299 | 7/1996 | Girard et al. | 95/102 X |
| 5,620,501 | 4/1997 | Tamhankar et al. | 95/96 X |
| 5,702,504 | 12/1997 | Schaub et al. | 95/101 |
| 5,846,294 | 12/1998 | Doong | 95/98 |

*Primary Examiner*—Robert H. Spitzer
*Attorney, Agent, or Firm*—Philip H. Von Neida; Salvatore P. Pace

[57] ABSTRACT

High purity strongly adsorbed gas, e. g., carbon monoxide, is separated from a gas mixture containing one or more other gas components, e. g., hydrogen carbon dioxide, methane, nitrogen and possibly other impurities, by a two-phase pressure swing adsorption process carried out in one or more adsorption vessels arranged in parallel and containing adsorbent which adsorbs the strongly adsorbed gas more readily than the other components of the gas mixture. The process includes two evacuation steps and two or more purge steps.

31 Claims, 2 Drawing Sheets

TWO PHASE PRESSURE SWING ADSORPTION PROCESS

FIELD OF THE INVENTION

This invention relates to pressure swing adsorption (PSA) gas mixture separation processes, and more particularly to gaseous PSA processes in which it is desired to recover the more strongly adsorbed component of the gas mixture in very high purity. Specifically, the invention is a two-phase PSA process in which the desorbed product from the first phase is subjected to a second adsorption phase and the only finished product removed from the system during the second phase is the second phase desorbed component.

BACKGROUND OF THE INVENTION

Components of gas mixtures are frequently separated from the gas mixtures by PSA. Although PSA is generally more useful when the desired component is the least strongly adsorbed component, this gas separation technique can be successfully used when the desired component is more strongly adsorbed by the selected adsorbent than are the other components of the gas mixture. For example, carbon monoxide can be separated from gas mixtures containing, in addition to carbon monoxide, hydrogen, carbon dioxide, methane and nitrogen by means of cuprous ion-containing adsorbents. Such mixtures often occur in syngas, a hydrogen and carbon monoxide mixture produced in hydrocarbon reforming processes. It is difficult, however, to recover carbon monoxide in high purity, even using copper-modified adsorbents, because carbon dioxide, methane and nitrogen are generally coadsorbed to some degree by most adsorbents.

Certain procedures, such as cocurrently purging the adsorbent with desorbed product gas before the evacuation step, enhance the purity of the strongly adsorbed product. However, it usually requires a considerable quantity of product gas purge to obtain reasonable purity of the desorbed product gas, and even when the purge gas effluent is recycled to the feed stream, the yield of product gas is low. Process improvements which enhance the purity of strongly adsorbed product gas without sacrificing the product gas yield are continually sought. The present invention provides such an improvement.

SUMMARY OF THE INVENTION

The invention presents a two phase PSA process in which the desorbed gas from the first phase is used as a purge gas during the second phase of the process. This increases the purity of the desired strongly adsorbed component produced in the second phase of the process.

In a broad embodiment, the invention comprises a process for separating a desired strongly adsorbed gas (adsorbable gas) from a feed gas mixture by a pressure swing adsorption process comprising, in sequence, the steps:

(a) passing the feed gas mixture at superatmospheric pressure cocurrently through at least one adsorption zone containing an adsorbent which selectively adsorbs the adsorbable gas from the feed gas mixture, thereby producing a first adsorbable gas-depleted gas stream (FIG. 2, step 2);

(b) depressurizing the adsorption zone, thereby producing an adsorbable gas-enriched gas stream (FIG. 2, step 6);

(c) purging the adsorbent in the at least one adsorption zone with adsorbable gas-enriched stream from step (b), thereby producing a first purge effluent (FIG. 2, step (9);

(d) purging the adsorbent in the at least one adsorption zone with adsorbable gas-enriched product, thereby producing a second purge effluent (FIG. 2, step 10);

(e) depressurizing the at least one adsorption zone, thereby producing the adsorbable gas-enriched product (FIG. 2, step 11).

Generally, in preferred embodiments the process further includes, prior to step (a), pressurizing the at least one adsorption zone to the desired superatmospheric pressure with feed gas mixture, first adsorbable gas-depleted gas stream or combinations of these (FIG. 2, step 1).

In a preferred embodiment, the process further includes, between steps (a) and (b), additional step (a1), comprising partially depressurizing the at least one adsorption zone, thereby producing a second adsorbable gas-depleted gas stream (FIG. 2, step 4).

In another preferred embodiment, the process further comprises, between steps (a) and (a1), the step of partially depressurizing the at least one adsorption zone, thereby producing an additional adsorbable gas-depleted gas stream (FIG. 2, step 3).

In another preferred embodiment, the process further comprises, between steps (a1) and (b), purging the at least one adsorption zone with the first purge effluent, with the second purge effluent or with both the first purge effluent and the second purge effluent, thereby producing a third purge effluent (FIG. 2, step 5).

In another preferred embodiment, the process further comprises, between steps (b) and (c), additional step (b1), comprising passing said second adsorbable gas-depleted gas stream through said at least one adsorption zone, preferably in the cocurrent direction, thereby producing a third adsorbable gas-depleted gas stream (FIG. 2, step 7).

In another preferred embodiment, the process further comprises, between steps (b1) and (c), additional step (b2), comprising purging the at least one adsorption zone with the third purge effluent, preferably in the cocurrent direction, thereby producing a fourth purge effluent (FIG. 2, step 8).

Steps (b) and (e) are preferably carried out by depressurizing the at least one adsorption zone in the countercurrent direction, and steps (a1), (c) and (d) are preferably carried out by flowing gas out of the at least one adsorption zone in the cocurrent direction.

In other preferred embodiments, one or more of the additional adsorbable gas-depleted gas stream, the third adsorbable gas-depleted gas stream, the first purge effluent, the second purge effluent and the fourth purge effluent are introduced into the at least one adsorption zone during step (a).

The process is well suited to the recovery of carbon monoxide as the adsorbable gas. In this case, the adsorbent in the at least one adsorption zone contains cations independently selected from copper$^+$ ions, silver$^+$ ions, palladium$^{++}$ ions or mixtures of these. In another embodiment, the adsorbent in the at least one adsorption zone independently comprises a porous substrate independently selected from carbon, silica gel, alumina, zeolites or mixtures of these. In a more preferred aspect of this embodiment, the adsorbent in the at least one adsorption zone contains copper$^+$ ions, silver$^+$ ions or both of these. In a most preferred aspect of this embodiment, the adsorbent in the at least one adsorption zone is copper$^+$-containing alumina, silver$^+$-containing alumina or both of these.

The process is particularly adaptable for the separation of carbon monoxide from carbon dioxide, methane or mixtures of these. It works well likewise, when the feed gas additionally contains hydrogen.

The pressure swing adsorption process of the invention is generally carried out at a temperature in the range of about 0 to about 150° C. Step (a) of the process is usually carried out at a pressure in the range of about 2 to about 70 bara. Steps (b) and (e) of the adsorption process are usually carried out at a pressure in the range of about 50 millibara to about 5 bara. When steps (b) and (e) are carried out under a vacuum, i. e., at a pressure less than about 1 bara (bar absolute) vacuum means is used. In a preferred embodiment of this embodiment, steps (b) and (e) are carried out using the same vacuum means.

In another preferred embodiment of the invention, the adsorption process is carried out in two or more adsorption zones. In a preferred embodiment, the process is carried out in a plurality of adsorption zones arranged in parallel and operated out of phase. In a more preferred aspect of this embodiment, the process is carried out in four adsorption zones operated out of phase.

Figure 1:
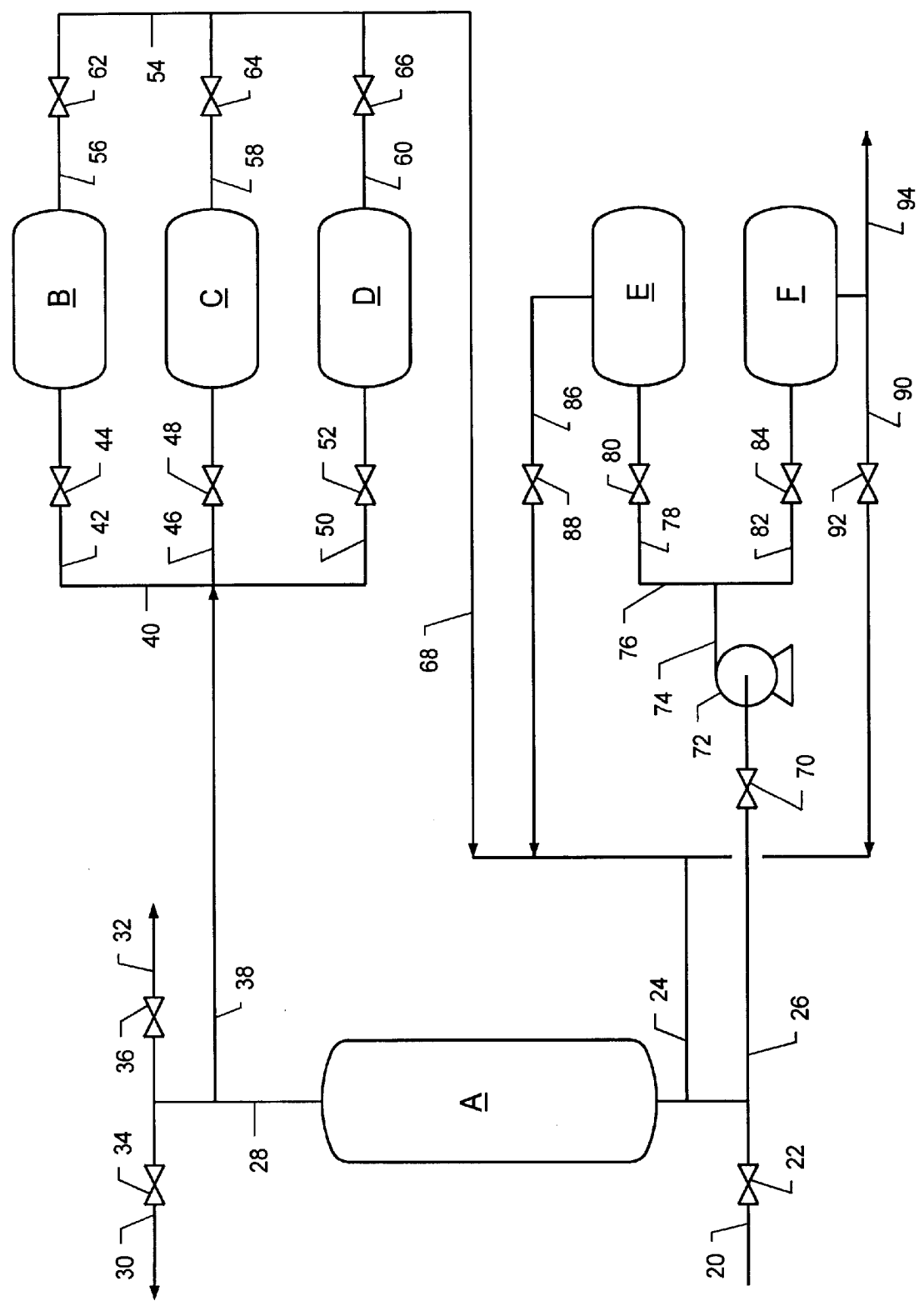
FIG. 1 is a schematic representation of one embodiment of the invention comprising a single adsorption vessel PSA system.

Valves, lines and equipment that are not necessary for an understanding of the invention have not been included in the drawing.

DETAILED DESCRIPTION OF THE INVENTION

The invention is a process for separating a selected gas in high purity from a gas mixture by a PSA process carried out in a single adsorption zone, e. g., a vessel, or in two or more adsorption vessels arranged in parallel. Key features of the process of the invention are that it includes two adsorption steps, several purge steps and two adsorbent regeneration steps.

The first adsorption step is conducted at superatmospheric pressure. Following the first adsorption step are a series of partial depressurization steps, with each partial depressurization step further reducing the pressure in the adsorption vessel. An adsorbent purge and an adsorbent regeneration (vent or evacuation) step follow the depressurization steps. This completes the first phase of the process.

Following the evacuation step, gas discharged from the adsorption vessel during one or more of the depressurization steps is passed through the adsorption vessels at low pressure. This results in the adsorption of additional strongly adsorbed gas component. The adsorbent in the adsorption vessel is next purged with purge gas from an earlier step, then purged with gas removed from the adsorbent during the first evacuation step, then purged with gas desorbed from the adsorbent during the final evacuation step, which follows. The final evacuation step completes the cycle. These features enhance purity and yield of the strongly adsorbed product gas product made by the process of the invention.

The adsorption system used in the invention comprises a single adsorption unit or a battery of adsorption units operated in phase, or a plurality of adsorption units or batteries of adsorption units operated out of phase, whichever is desired. When a system comprising a single adsorption unit or a battery of units all of which are operated in phase is used, the adsorption step must be periodically stopped to permit regeneration of the adsorbent bed(s), whereas when a plurality of adsorption units are employed in parallel and operated out of phase, one or more units can be in adsorption service adsorbing the desired gas component, while one or more other units are undergoing regeneration to desorb and collect the adsorbed gas component. Operation of the adsorption systems of the invention is cyclical. In the preferred adsorption process, cycles are repeatedly carried out in a manner such that step A (adsorption) and step E (regeneration) are substantially continuous.

The system illustrated in the FIG. 1 is a simple version of a plant useful for practice of the invention. In the drawing, the adsorption zone is represented as the single adsorption vessel A. Vessels B–E are intermediate gas storage vessels and vessel F is the purified, strongly adsorbed gas product storage vessel. In a single adsorption vessel system, such as is illustrated in FIG. 1, the adsorption zone is operated intermittently. The invention will be described in detail as practiced with the illustrated arrangement, it being understood, however, that the illustrated arrangement is merely exemplary of systems suitable for practicing the process of the invention, and the system can comprise any of the above-described equipment arrangements.

The system is provided with feed gas inlet line 20, which, in the illustrated embodiment, is provided with valve 22. Prepurification units, such as condensers, dryers, etc. and compressors (not shown), may also be positioned upstream of vessel A. Attached to inlet line 20, downstream of valve 22 are purge gas line 24 and countercurrent depressurization line 26. On its outlet end, vessel A is provided with nonadsorbed gas discharge line 28, to which are connected nonadsorbed product gas line 30 and waste gas discharge line 32, which are provided with valves 34 and 36, respectively. Also connected to line 28 is cocurrent depressurization gas discharge line 38. On its downstream end, line 38 is connected to manifold 40, which, in turn, is connected to vessel B, via line 42, which is provided with valve 44; to vessel C via line 46, which is provided with valve 48, and to vessel D via line 50, which is provided with valve 52. Vessels B, C and D are connected to manifold 54 through lines 56, 58 and 60, respectively. Lines 56, 58 and 60 are fitted with valves 62, 64 and 66, respectively. Manifold 54 is also joined via line 68 to purge gas line 24.

Countercurrent depressurization line 26, fitted with valve 70, is connected to the inlet end of vacuum pump 72. The outlet end of pump 72 is connected to line 74, which is joined to manifold 76. Manifold 76 is joined to intermediate storage vessel E via line 78, which is fitted with valve 80, and to strongly adsorbed gas product storage vessel F via line 82, which is fitted with valve 84. Line 86, provided with valve 88 connects vessel E to line 68, and line 90, provided with valve 92 joins vessel F to line 24. Also connected to vessel F is strongly adsorbed product gas discharge line 94.

Figure 2:
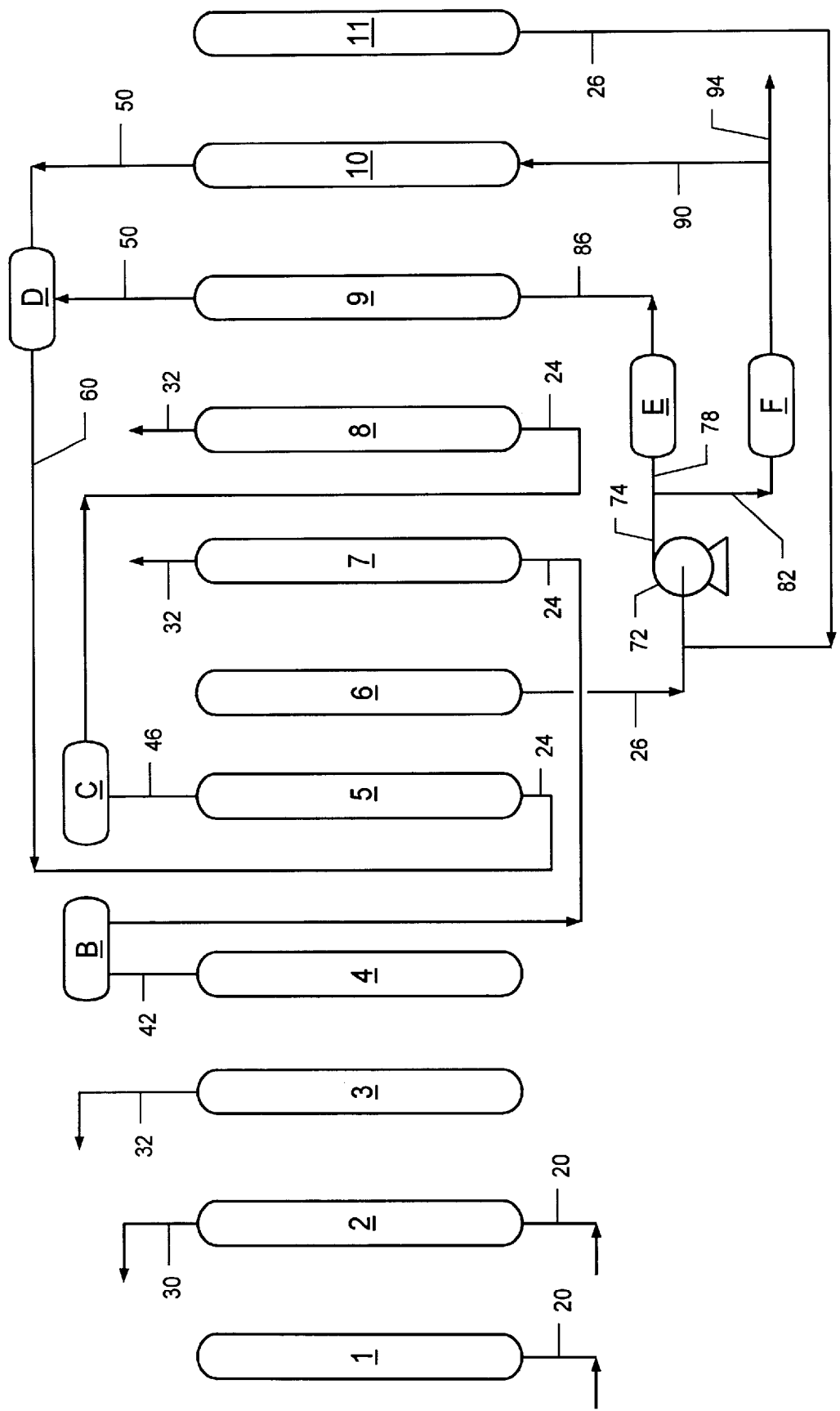
FIG. 2 is a schematic representation of the adsorption cycle steps in a preferred embodiment of the invention.

FIG. 2 depicts the eleven steps of the preferred embodiment of the invention. Communication between Vessel A and the various storage vessels and pump 72 are shown for each step.

The adsorbent used in vessel A will depend upon the particular gas to be separated from the gas mixture as the strongly adsorbed component. Typical adsorbents include silica gel, alumina, activated carbon, carbon molecular sieves, natural zeolites, such as mordenite, faujasite, clinoptilolite, chabazite, etc. and synthetic zeolites, such as types A, X and Y zeolites. When the strongly adsorbed gas being separated from the gas mixture is carbon monoxide, preferred adsorbents include copper$^+$-, silver$^+$-, and palladium$^{++}$-containing adsorbents of the above classes. Preferred carbon monoxide-selective adsorbents include copper ion and silver ion containing adsorbents, such as copper$^+$ salt- or silver$^+$ salt-containing alumina and copper$^+$ and silver$^+$-exchanged zeolites.

The pressure at which the PSA process adsorption step in vessel A is carried out is a matter of choice. Typically, the adsorption is carried out at a pressure above about 1 bar, absolute (bara). The upper pressure limit is determined by economics and limitations of the adsorption system and, in general, it is desirably about 70 bara, preferably about 20 bara and most preferably about 5 bara. The pressure at which adsorbent regeneration in vessel A is carried out is likewise a matter of choice, and the minimum pressure depends upon whether or not vacuum equipment is used to withdraw adsorbed gas from vessel A. Typically, the lower pressure limit during adsorbent regeneration in vessel A can be as low as 50 mbara (millibar absolute), but is preferably not lower than about 150 mbara, and is most preferably not lower than about 200 mbara. Adsorbent regeneration may be carried out at pressures as high as 5 bara, but is preferably carried out at pressures not higher than about 2 bara, and most preferably at pressures not above about 1 bara. The evacuation pressures in each evacuation phase of the process may be the same or different.

Although the system and process may be used to separate the components of any gas mixture, it will be described as it applies to the separation of carbon monoxide, as the sorbate, from a gas mixture comprised of hydrogen, carbon monoxide, carbon dioxide, methane and nitrogen.

The PSA process carried out in vessel A will be described as it is practiced in a preferred embodiment, which includes a feed pressurization step, an adsorption step, first and second cocurrent depressurization steps, a first purge step, a first countercurrent evacuation step, a second adsorption step, second, third and fourth cocurrent purge steps and a final evacuation step. However in broader embodiments, the process will not include all of these steps, and in more specific embodiments, it may include other steps. As used in this description, the cocurrent direction is the direction from the feed inlet of the adsorption vessel toward the nonadsorbed product gas outlet, and the countercurrent direction is the direction opposite the cocurrent direction.

At the beginning of the feed pressurization step (step 1 in FIG. 2), valve 22 is open and all other valves of the system are closed. Feed gas is now introduced into vessel A. As noted earlier, part of the pressurization of vessel A can be carried out by introducing nonadsorbed product gas from line 30 into vessel A, preferably in the countercurrent direction. When the pressure in vessel A reaches the desired adsorption pressure, valve 34 is opened to start the first adsorption step of the process (FIG. 2, step 2). Feed gas at the desired adsorption pressure now passes upwardly through the adsorbent in vessel A, and as it does so, carbon monoxide is adsorbed by the adsorbent in vessel A. Nonadsorbed product gas, comprised substantially of hydrogen and containing carbon dioxide, methane, nitrogen and a small amount of carbon monoxide, leaves vessel A through line 28, passes out of the system through line 30 and is transported to product storage or to a downstream application or further process operation. As first adsorption step proceeds, the adsorbed carbon monoxide front advances cocurrently through the bed of adsorbent toward the non-adsorbed product outlet end of vessel A. When it reaches the desired end point, which is preferably prior to breakthrough of carbon monoxide into line 28, the first adsorption step is terminated and optional first cocurrent depressurization step 3 begins.

During the optional cocurrent depressurization step, valve 36 is opened and all other valves of the system are closed. Void space gas is now discharged from vessel A, and this gas can be recycled to the adsorption vessel as feed gas, used as purge gas in other steps, sent to fuel or vented to the atmosphere via lines 28 and 32. When the pressure in vessel A drops to the desired level, the first cocurrent depressurization step is terminated and the second cocurrent depressurization step is started. If it is desired to eliminate the optional first purge step, the second cocurrent depressurization step will begin upon completion of the first adsorption step.

To effect the second cocurrent depressurization step (step 4 in FIG. 2), valve 44 is opened and valve 36 is closed (all other valves remain closed). Cocurrent depressurization gas now flows cocurrently out of vessel A, through line 28, then passes through line 38, manifold 40 and line 42, and into intermediate storage vessel B. This gas, which is somewhat richer in carbon monoxide than is the gas discharged from the system in step 3, will be fed into vessel A during a subsequent adsorption step. Step 4 is permitted to continue until the pressure in vessel A reaches the desired point, for example atmospheric pressure. Step 4 is then terminated and optional first cocurrent purge (step 5 of FIG. 2) is begun. This is accomplished by opening valve 48 and closing valve 44 (all other valves remain closed).

During step 5, gas flows out of vessel A through line 28, passes through line 38, manifold 40 and line 46 and enters vessel C. If optional step 5 is not included in the process, step 4 will usually be carried out until substantially all of the void space gas has been discharged from vessel A. When step 5 is included, it is continued until the desired purging is accomplished, and then this step is terminated and step 6 is initiated.

Step 6 is begun by closing valve 48 and opening valves 70 and 80, and activating vacuum pump 72 (when the depressurization is to be carried out to subatmospheric pressures, which is most often the case). Carbon monoxide-rich gas is now desorbed from the adsorbent in vessel A through line 26, is pumped through line 74, manifold 76 and line 78, and is stored in intermediate vessel E to await introduction into vessel A during upcoming step 9 of the process. Evacuation of vessel A is preferably continued until all carbon monoxide-enriched gas that can be reasonably and economically desorbed from the adsorbent in vessel A is obtained.

Upon completion of step 6, this step is terminated and step 7 is begun. This is effected by deactivating pump 72, closing valves 70 and 80 and opening valves 62 and 36. All other valves remain closed.

During step 7, gas flows out of vessel B through line 56, manifold 54, lines 68 and 24 and into vessel A via the inlet end of the vessel. The gas flows cocurrently through vessel A, and as it does so, carbon monoxide is adsorbed therefrom. Carbon monoxide-depleted gas exits vessel A through line 28 and leaves the system through line 32. The exit gas from this step is depleted in carbon monoxide and is generally used as fuel, recycled as feed gas, flared or vented to the atmosphere. When the predetermined duration of step 7 is reached, this step is terminated and step 8 initiated. This is accomplished by closing valve 62 and opening valve 64. Valve 36 remains open and all other valves remain closed.

During step 8, the adsorbent in vessel A is purged with gas from vessel C. This gas leaves vessel C through line 58, flows through manifold 54, lines 68 and 24 and enters vessel A through its inlet end. The purge gas passes through vessel A, and as it does so, additional carbon monoxide is adsorbed by the adsorbent in this vessel. During this step, carbon monoxide-depleted gas passes out of vessel A through line 28 and leaves the system through line 32. This gas is depleted in carbon monoxide and is generally recycled as feed gas, used as fuel or vented to the atmosphere. When step 8 is completed, termination of this step is effected by closing valve 64, and step 9 is begun by opening valves 52 and 88. Valve 36 is closed and all other valves remain closed.

During step 9, vessel A is cocurrently purged with carbon monoxide-rich gas from vessel E. This step results in the further carbon monoxide enrichment of the sorbed phase in vessel A. Gas purged from vessel A during this step passes through lines 28 and 38, manifold 40 and line 50 and is stored in vessel D to await the next occurrence of purge step 5, during which it flows cocurrently through vessel A. Upon completion of step 9, valve 88 is closed and valve 92 opened, thereby ending step 9 and beginning step 10. Valve 52 remains open and all other valves are closed.

During step 10, high purity carbon monoxide gas from vessel F passes through lines 90 and 24 and flows cocurrently through vessel A. This gas displaces additional non-adsorbed or weakly adsorbed gaseous impurities from the adsorbent in vessel A and purges the impurities from vessel A. The purged gas leaves vessel A through line 28 and passes through line 38, manifold 40 and line 50 and enters vessel D as additional purge gas for step 5. Upon completion of step 10, this step is terminated and step 11 initiated by closing valves 52 and 92, opening valves 70 and 84 and activating pump 72.

Step 11, the last step of the current adsorption cycle, is carried out until the vessel A is evacuated to the desired extent. The high purity gas evacuated from vessel A is stored in vessel F. Some of this gas is used to purge vessel A in the next occurrence of purge step 10, and the rest is discharged from the system and sent to final storage, a downstream application or further processing. Upon completion of step 11, the current adsorption cycle is completed, and the cycle is then repeated, starting with step 1.

In one variation of the above-described method of practicing the invention, step 3 can be eliminated, in which case the gas normally discharged from the system during step 3 will be sent to vessel B during the next step of the process (step 4). However, since the void gas at the top of vessel A is discharged from the system during step 3, and this gas contains somewhat less carbon monoxide than the gas in the lower part of vessel A, it is preferred to keep step 3 in the process.

In another variation of the process, step 8, the second vessel A purge step, is eliminated from the process. In this alternative, the gas purged from vessel A during step 5, the first vessel A purge step, can be recycled to vessel A as feed gas or discharged from the system and used as fuel or in other applications. This variation can be combined with the variation in which step 3 is eliminated from the process, if desired.

In a third variation of the process, both steps 5 and 8 are eliminated from the preferred process. In this event, the gas stored in vessel D can be recycled to vessel A during steps 2 and/or 7 as feed gas, or it can be discharged from the system for use as fuel or in other applications. This variation can also be combined with the variation in which step 3 is eliminated from the process, if desired.

If it is desired that the gas being passed through vessel A during one or more of steps 5, 7 and 8 be at pressures higher than the pressures at which the gases are available in vessels B and/or C and/or D, it may be necessary to include a supplemental gas pressurization means, such as a gas compressor in the system. The supplemental gas pressurization means can be positioned at any appropriate part of the system, such as in line 68, for example.

It will be appreciated that it is within the scope of the present invention to utilize conventional equipment to monitor and automatically regulate the flow of gases within the system so that it can be fully automated to run continuously in an efficient manner.

The Table illustrates a preferred embodiment of the invention in which four adsorption vessels, vessels B1 to B4, are operated in parallel and 90° out of phase, and a single vacuum pump is used for all evacuation steps of the process. The adsorption cycle includes the eleven steps of the preferred cycle described above and illustrated in FIG. 2. Referring to the Table and to FIG. 2, the steps of the cycle are: adsorption (AD), step 2; cocurrent depressurization (CO), step 3; cocurrent depressurization to purge (CP), step 4; first purge (P1), step 5; first evacuation (E1), step 6; adsorption/purge (AP), step 7; second purge (P2), step 8; third purge (P3), step 9; fourth purge (P4), step 10; second evacuation (E2), step 11; and repressurization (RP), step 1. It can be readily observed that the vacuum pump (used in steps E1 and E2) is in continuous service throughout the cycle

TABLE

| B1 | AD | | CO | CP | P1 | E1 | AP | P2 | P3 | P4 | E2 | | RP | | AD |
|----|----|----|----|----|----|----|----|----|----|----|----|----|----|----|----|
| B2 | E2 | | RP | | AD | | CO | CP | P1 | E1 | AP | P2 | P3 | P4 | E2 |
| B3 | P2 | P3 | P4 | E2 | | RP | | AD | | CO | CP | | P1 | E1 | AP |
| B4 | CP | P1 | E1 | AP | P2 | P3 | P4 | E2 | | RP | | | AD | | CO |

The invention is further illustrated by the following example in which, unless otherwise indicated, parts, percentages and ratios are on a volume basis.

EXAMPLE

This hypothetical example is based on a simplified adsorption cycle similar to the cycle illustrated in FIG. 2. The experiment was carried out in a pair of adsorption vessels operated in parallel and 180° out of phase with each bed containing 1500 cm$^3$ of Cu$^+$-exchanged type Y zeolite. The beds were operated at a half-cycle time of 58 min and at a temperature of about 80° C. The cycle comprises the steps: feed pressurization, adsorption, cocurrent depressurization, first cocurrent purge with second cocurrent purge effluent gas, first evacuation, idle, cocurrent feed with first evacuation effluent gas, idle, second cocurrent purge with strongly adsorbed gas product stream and second evacuation to produce strongly adsorbed gas product stream.

The feed stream, comprised of 11.3% carbon monoxide, 4.1% methane, 10.5% carbon dioxide and the balance hydrogen, is introduced into the adsorption vessels at a pressure of 18 bara and a flow rate of 2.53 slpm (standard liters per minute). The strongly adsorbed product gas flow rate was 0.216 slpm and it comprised 99.2% carbon monoxide, 130 ppm methane, 0.62% carbon dioxide and 1900 ppm hydrogen. This example shows that a high purity carbon monoxide product stream can be produced by the process of the invention using a single vacuum pump.

Although the invention has been described with particular reference to specific equipment arrangements and a specific experiment, these features are merely exemplary of the invention and variations are contemplated. For example, the process can be operated under conditions which do not require the use of a vacuum pump. Likewise, the process can be used to separate other gas mixtures, such as air. The scope of the invention is limited only by the breadth of the appended claims.

What is claimed is:

1. A process for separating an adsorbable gas from a feed gas mixture by a pressure swing adsorption process comprising, in sequence, the steps:
    (a) passing said feed gas mixture at superatmospheric pressure cocurrently through at least one adsorption zone containing an adsorbent which selectively adsorbs said adsorbable gas from said feed gas mixture, thereby producing a first adsorbable gas-depleted gas stream;
    (b) depressurizing said adsorption zone, thereby producing an adsorbable gas-enriched gas stream;
    (c) purging the adsorbent in said at least one adsorption zone with said adsorbable gas-enriched gas stream, thereby producing a first purge effluent;
    (d) purging the adsorbent in said at least one adsorption zone with adsorbable gas-enriched product, thereby producing a second purge effluent; and
    (e) depressurizing said at least one adsorption zone, thereby producing said adsorbable gas-enriched product.

2. The process of claim 1, further comprising, prior to step (a), pressurizing said at least one adsorption zone to said superatmospheric pressure with feed gas mixture, first adsorbable gas-depleted gas stream or combinations of these.

3. The process of claim 2, wherein steps (b) and (e) are carried out by countercurrently depressurizing said at least one adsorption zone.

4. The process of claim 2, further comprising, during step (a) introducing into said one adsorption zone said first purge effluent, said second purge effluent or both said first purge effluent and said second purge effluent.

5. The process of claim 2 further comprising, between steps (a) and (b), additional step (a1), comprising partially depressurizing said adsorption zone, thereby producing a second adsorbable gas-depleted gas stream.

6. The process of claim 5, further comprising, between steps (a) and (a1), partially depressurizing said at least one adsorption zone, thereby producing an additional adsorbable gas-depleted gas stream.

7. The process of claim 6, further comprising, during step (a), introducing into said at least one adsorption zone said additional adsorbable gas-depleted gas stream.

8. The process of claim 5 or claim 6, further comprising, between steps (a1) and (b), purging said at least one adsorption zone with said first purge effluent, with said second purge effluent or with both said first purge effluent and said second purge effluent, thereby producing a third purge effluent.

9. The process of claim 5 or claim 6, further comprising, between steps (b) and (c), additional step (b1), comprising passing said second adsorbable gas-depleted gas stream through said at least one adsorption zone, thereby producing a third adsorbable gas-depleted gas stream.

10. The process of claim 9, further comprising, during step (a), introducing into said at least one adsorption zone said third adsorbable gas-depleted gas stream.

11. The process of claim 9, further comprising, between steps (b1) and (c), additional step (b2), comprising purging said at least one adsorption zone with said third purge effluent, thereby producing a fourth purge effluent.

12. The process of claim 11, further comprising, during step (a), introducing into said at least one adsorption zone said fourth purge effluent.

13. The process of claim 11, wherein, during step (b2), adsorbent in said at least one adsorption zone is purged by passing said third purge effluent cocurrently therethrough.

14. The process of claim 9, wherein, during step (b1), said second adsorbable gas-depleted stream is passed cocurrently through said at least one adsorption zone.

15. The process of claim 5 or claim 6, wherein steps (b) and (e) are carried out by countercurrently depressurizing said at least one adsorption zone.

16. The process of claim 15, wherein during steps (a1), (c) and (d) gas flows cocurrently out of said at least one adsorption zone.

17. The process of any one of claims 1, 5 or 6, wherein said pressure swing adsorption process is carried out at a temperature in the range of about 0 to about 150° C.

18. The process of any one of claims 1, 5 or 6, wherein step (a) is carried out at a pressure in the range of about 2 to about 70 bara.

19. The process of claim 18, wherein steps (b) and (e) are carried out at a pressure in the range of about 50 millibara to about 5 bara.

20. The process of claim 19, wherein steps (b) and (e) are carried out at a pressure less than about 1 bara using vacuum means.

21. The process of claim 20, wherein steps (b) and (e) are carried out using the same vacuum means.

22. The process of claim 21, wherein said at least one adsorption zone comprise a plurality of adsorption zones.

23. The process of claim 22, wherein said plurality of adsorption zones are arranged in parallel and operated out of phase.

24. The process of claim 23, wherein said at least one adsorption zone comprise four adsorption zones.

25. The process of claim 2, wherein said adsorbable gas is carbon monoxide.

26. The process of claim 25, wherein the adsorbent in said at least one adsorption zone contains cations independently selected from copper$^+$ ions, silver$^+$ ions, palladium$^{++}$ ions or mixtures of these.

27. The process of claim 26, wherein the adsorbent in said at least one adsorption zone independently comprises a porous substrate independently selected from carbon, silica gel, alumina, zeolites or mixtures of these.

28. The process of claim 27, wherein the adsorbent in said at least one adsorption zone contains copper$^+$ ions, silver$^+$ ions or both of these.

29. The process of claim 28, wherein the adsorbent in said at least one adsorption zone is copper$^+$-containing alumina, silver$^+$-containing alumina or both of these.

30. The process of claim 29, wherein said feed gas mixture further comprises carbon dioxide, methane or mixtures of these.

31. The process of claim 30, wherein said feed gas mixture additionally contains hydrogen.

* * * * *